Dec. 2, 1952  R. W. LENTON  2,619,817
MANUFACTURE OF SINKERS FOR STRAIGHT-BAR KNITTING MACHINES
Filed April 29, 1950
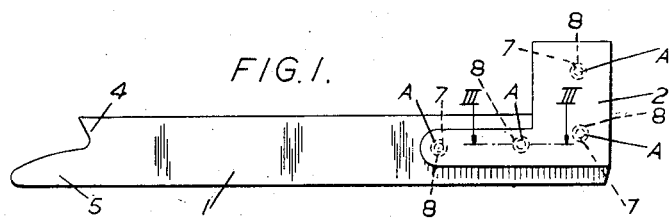
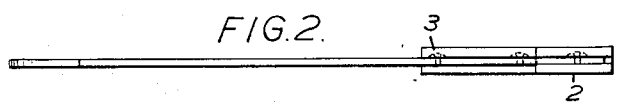
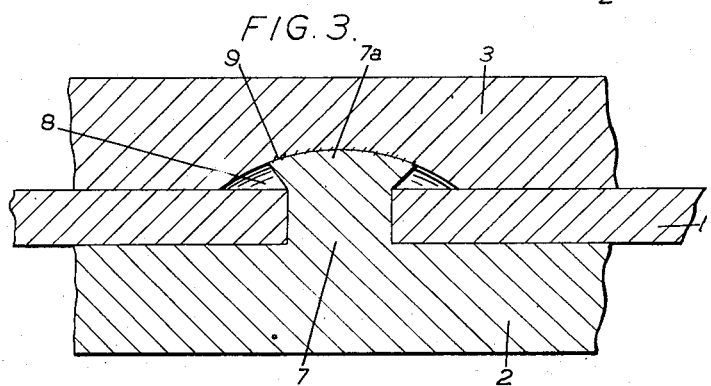
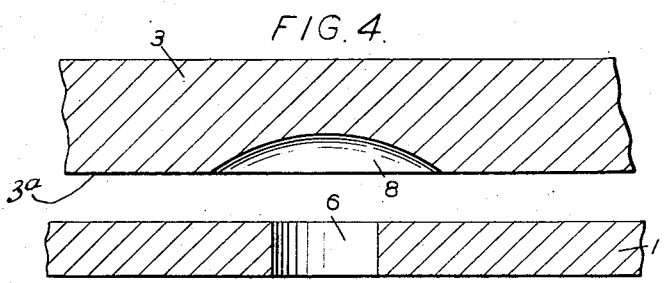
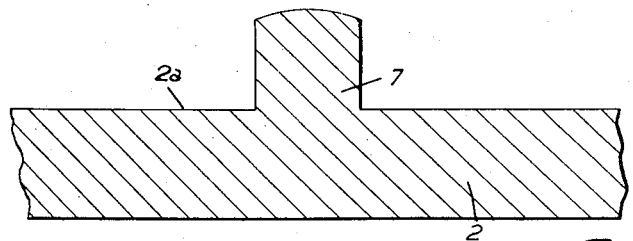
Inventor
Ronald W. Lenton
By Patented Dec. 2, 1952

2,619,817

UNITED STATES PATENT OFFICE 2,619,817

MANUFACTURE OF SINKERS FOR STRAIGHT-BAR KNITTING MACHINES

Ronald William Lenton, Leicester, England, assignor to The General Presswork & Stampings Limited, Leicester, England, a British company Application April 29, 1950, Serial No. 159,056
In Great Britain May 6, 1949

3 Claims. (Cl. 66—110)

This invention relates to sinkers of the class used in straight-bar knitting machines, e. g. of the Cottons patent type, and has reference particularly to such sinkers of the kind composed of at least three metal laminae, i. e. facially assembled plates or strip elements, which are united by welding together the metal of the outer laminae through holes formed in the intermediate lamina or laminae.

It is principally the intention to apply the invention to a sinker of the kind comprising a stamped relatively thin central blade of high grade carbon steel, and, secured to the rear end of this blade at opposite sides thereof, complementary L-shaped stampings, known as cleats, of softer sheet steel serving not only to reinforce the blade but also to provide, between them, an upstanding butt by means of which the sinker is adapted to be moved, e. g. by a catch-bar and jack, during its operation in a straight-bar knitting machine. A sinker of this kind is commonly known, and will for the sake of convenience be hereinafter referred to in the following further description and in the appended claims, as a "cleated sinker." The butt of a cleated sinker is usually made thicker than the blade so as to be capable of withstanding the striking action of the machine jacks.

The invention involves a method of manufacture of a cleated sinker, in which the component parts are united by a welding process. Having regard to the fact that the central blade is composed of high grade carbon steel, however, welding is accompanied by difficulties since it is impracticable to weld such steel by the resistance welding process, and the fusing heat generated during the process and the subsequent rapid cooling crystalises and causes disintegration of this class of steel. If, therefore, the laminae of a cleated sinker were to be simply spot welded, the two relatively soft L-shaped cleats would be secured to the carbon steel central blade only by thin films of brittle metal and would quickly come adrift. With the object of attempting to solve this problem it has previously been proposed to drill holes through the central blade, and to indent either or both of the outer L-shaped cleats suchwise as to provide projecting formations which enter or pass through the said holes, the L-shaped cleats being homogeneously secured together by spot welding at the points of indentation.

Now whilst this previously proposed method is in many instances fairly satisfactory, it does have the disadvantage that the welding, taking place contiguously with the central blade, still tends in some measure to crystalise and cause disintegration of the carbon steel. Moreover, the volume of fused softer steel is sometimes insufficient properly to fill the drilled holes in the central blade, in which instance the union between the laminae is incomplete. On the other hand, it sometimes happens that there is too much fused metal.

In addition to providing an improved sinker offering greater resistance to breakage, it is an object of the present invention to provide an improved method of sinker manufacture which will obviate the difficulties and disadvantages of the hereinbefore described previously proposed method.

The improved sinker constituting this invention is composed of three or more facially connected metal laminae and is characterised in that projecting formations on the outer lamina at one side of the sinker extend laterally right through spaced perforations in the intermediate lamina or laminae into cavities formed in the outer lamina at the other side in which cavities the appropriate ends of the said formations are welded or fused.

The cavities in the appropriate outer lamina are preferably of somewhat larger diameter than the aforesaid projecting formations and the perforations through which they extend, and are consequently in the nature of pockets into which the fused metal can freely flow and spread to form securing heads.

The invention includes as a feature a method of producing a sinker which consists in taking an outer lamina which is so pressed (i. e. "coined") as to have rivet-like protuberances thereon, inserting the said protuberances into and pressing them through perforations formed in an intermediate lamina or laminae, taking a further outer lamina having cavities formed therein and applying it facially to the intermediate lamina, or the appropriate intermediate lamina, as the case may be, so that the projecting ends of the protuberances are located in the cavities, and spot welding the last mentioned lamina at points coinciding with the cavities.

In the improved method the fused metal of the relatively soft outer laminae is not united within the perforations. On the contrary, the welding or fusing of the outer ends of the lateral protuberances takes place within the cavities in the appropriate outer lamina, that is to say at locations removed from the intermediate lamina or laminae. Accordingly, the fusing heat generated during the welding process does not adversely affect the intermediate lamina or laminae. Moreover, the pocket-like cavities in the appropriate outer lamina are sufficiently large safely to receive a variable volume of fused metal. In short, the fused ends of the protuberances can spread sufficiently to provide heads well adapted tightly to secure the laminae together without necessarily filling the cavities.

In order that the invention may be more clearly understood and readily carried into practical effect, a specific example thereof applied to a cleated sinker, and a method of assembling the same, will now be described with reference to the accompanying drawing, wherein, Figure 1 is a side view of the said sinker, Figure 2 is an edge or plan view of the same, Figure 3 is a greatly enlarged detail longitudinal sectional view taken on the line III—III of Figure 1, and Figure 4 is an exploded detail sectional view showing a portion of the central blade and portions of the cleats as they appear prior to assembly.

Like parts are designated by similar reference characters throughout the drawing.

Referring to Figures 1 and 2, it will be seen that the sinker comprises a single suitably shaped central blade 1 of hard carbon steel having its rear end reinforced by two L-shaped cleats 2 and 3 of softer steel connected facially to respectively opposite sides of the blade 1. At its leading end, i. e. operative, end the central blade 1 is formed with a claw-shaped catch 4 which forms or divides a loop, and an adjoining nib or nose 5. The central blade 1 is pierced or drilled to provide a plurality of spaced holes such as 6 (Figure 4). In the specific example being considered there are four of such holes—one at each of the points marked A in Figure 1. The cleat 2 is so pressed ("coined") as to produce on its inner face 2a (Figure 4) relatively long rivet-like protuberances 7 at positions on the said cleat corresponding to the positions of the holes 6 in the blade 1. The pressing or coining of the cleat 2 is, moreover, such that when this cleat is assembled in position with the blade 1, the rivet-like protuberances 7 extend right through and project a little beyond the holes 6 in the blade. The other L-shaped cleat 3 is punched or otherwise lightly indented on its inner face 3a (Figure 4) to provide, again at positions corresponding to the positions of the holes 6 in the blade 1, a plurality of spaced concave cavities 8 of somewhat larger diameter than the holes 6. The cleat 3 is then assembled in position with the projecting ends of the rivet-like protuberances 7 located in the cavities 8, and the three components of the sinker are secured together by spot welding at positions where the cleats 2 and 3 are respectively pressed and indented. Thus, the projecting ends 7a of the protuberances 7, and the cleat 3 having therein the cavities 8 are homogeneously welded together, as indicated at 9 in Figure 3, to provide an exceptionally strong assembly at the rear part of the sinker. The fused, comparatively soft steel of the protuberances 7 is upset and caused to spread to the extent of filling up or partially filling up the cavities 8. Accordingly, and as shown in Figure 3, the projecting formations 7 in effect simulate rivets, the fused outer ends 7a of which are enlarged and flared like the hammered ends of rivets.

The holding together of the assembled portions during welding is, of course, preferably done in a suitable jig or fixture.

In the actual welding operation it is found advantageous to employ a modern type of welding machine equipped with automatic cut-outs which gives consistently uniform welds irrespective of the skill of the operator.

What I claim then is:

1. A cleated sinker for a straight-bar knitting machine, comprising a single central blade of hard carbon steel in which are formed spaced holes, an L-shaped cleat of softer steel applied to one side of the rear end of the central blade, the said cleat having on the inner face thereof rivet-like protuberances which extend laterally right through the aforesaid holes, and a further L-shaped cleat of relatively soft steel which is applied to the opposite side of the rear end of the central blade and has formed therein concave cavities which are of larger diameter than the holes in the said central blade and accommodate the ends of the protuberances, the said ends being fused by welding within the cavities and flared like rivet heads so that they secure the cleats to and in facial contact with the central blade.

2. A sinker for a straight-bar knitting machine comprising a lamina of hard carbon steel in which are formed spaced holes, a lamina of relatively soft steel which is arranged at one side of the first mentioned lamina and is formed with rivet-like projections extending laterally right through the aforesaid holes and another lamina of relatively soft steel arranged at the opposite side of the lamina of hard carbon steel and in which are formed concave cavities which are of larger diameter than the holes and arranged to accommodate the ends of the rivet-like projections, the said ends being fused by welding within the concave cavities and flared like rivet heads so that they secure the laminae together in facial contact.

3. A method of producing a sinker for a straight-bar knitting machine comprising the steps of taking an outer lamina having rivet-like protuberances thereon and inserting the said protuberances into and pressing them laterally right through holes formed in an intermediate lamina, taking a further outer lamina having formed therein concavities which are of larger diameter than the said holes and applying the said further outer lamina facially to the intermediate lamina so that the projecting ends of the rivet-like protuberances are located in the said concavities, and spot welding the last mentioned lamina at points coinciding with the concavities so that the ends of the rivet-like protuberances become fused, and caused to spread within the concavities whereby they simulate flared rivet heads serving to secure together all of the laminae.

RONALD WILLIAM LENTON.

REFERENCES CITED

The following references are of record in the file of this patent:

UNITED STATES PATENTS

| Number | Name | Date |
| --- | --- | --- |
| 1,784,256 | Stout | Dec. 9, 1930 |
| 1,948,599 | Stout | Feb. 27, 1934 |
| 2,179,888 | Green | Nov. 14, 1939 |
| 2,247,611 | Frischman | July 1, 1941 |
| 2,256,428 | Green | Sept. 16, 1941 |